Aug. 3, 1943.     D. A. WILBUR     2,325,927
SPEED INDICATOR
Filed Oct. 3, 1940     2 Sheets-Sheet 1
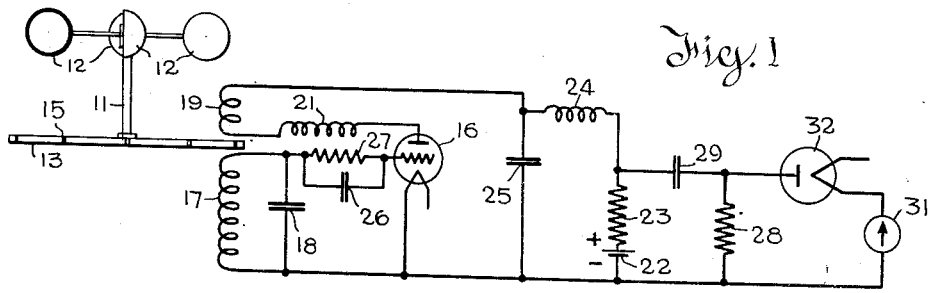
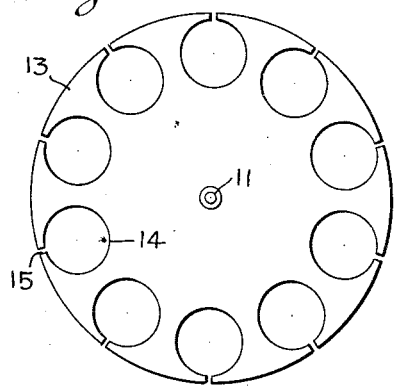
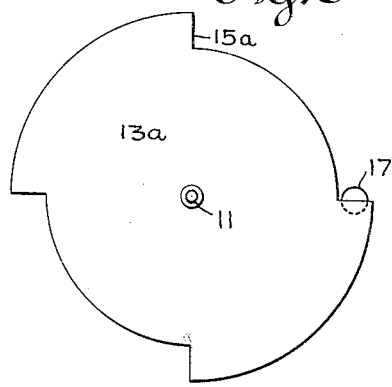
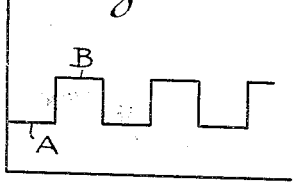
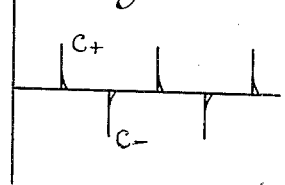
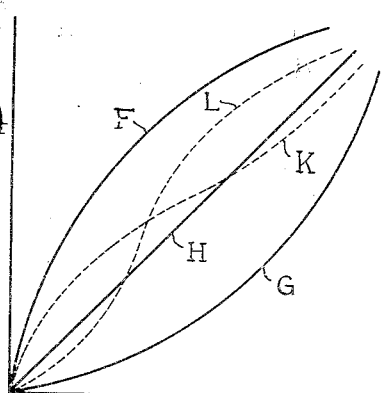
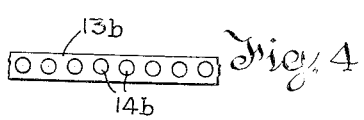
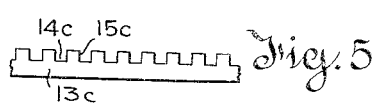
Inventor
Donald A. Wilbur
Attorneys Aug. 3, 1943.    D. A. WILBUR    2,325,927
SPEED INDICATOR
Filed Oct. 3, 1940    2 Sheets-Sheet 2
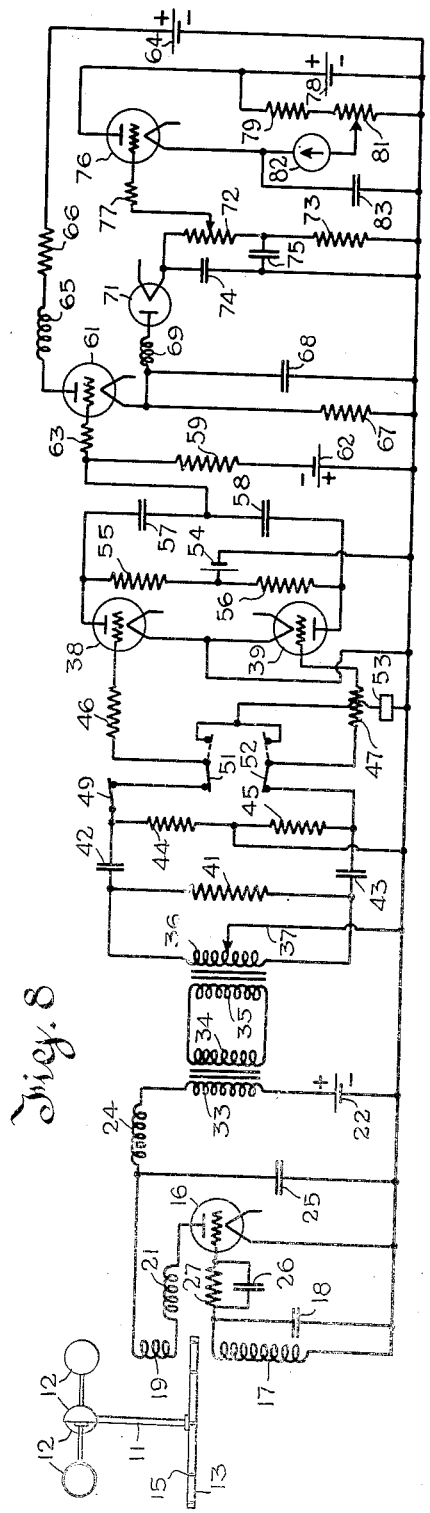
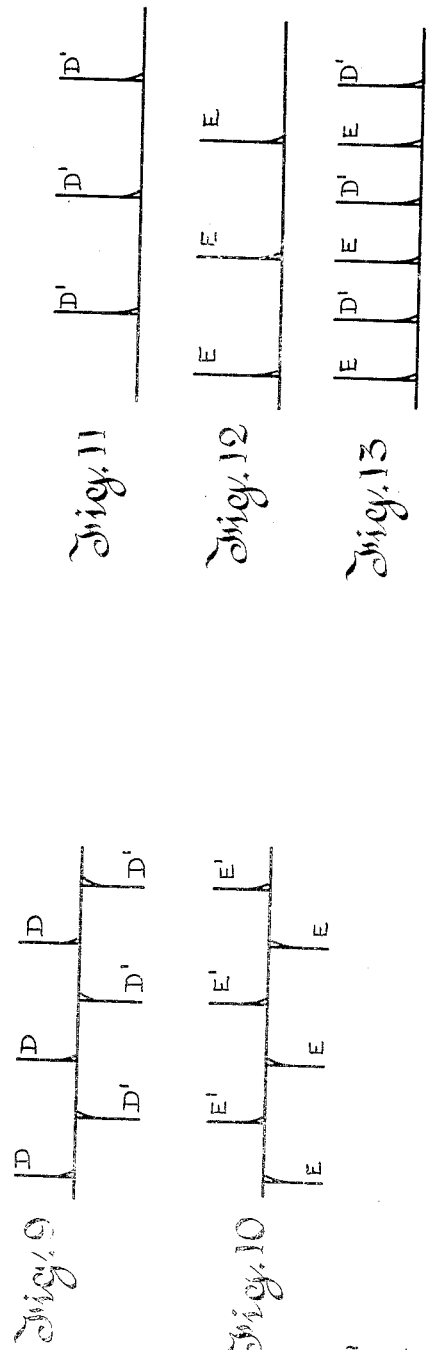
Inventor
Donald A. Wilbur
By 
Attorneys Patented Aug. 3, 1943

2,325,927

UNITED STATES PATENT OFFICE 2,325,927

SPEED INDICATOR

Donald A. Wilbur, Troy, N. Y., assignor to W. & L. E. Gurley, Troy, N. Y., a corporation of New York Application October 3, 1940, Serial No. 359,599

12 Claims. (Cl. 175—183)

This invention relates to speed indicators for indicating the speed of a moving element, such as a rotating element or one having translatory motion.

Many measuring devices involve indication of the rate of motion of some part and many such devices develop small motive forces, typical instances being anemometers and water current meters. Where the motive force is very small, as is often the case, particularly at low speeds, indeterminate disturbing factors are introduced.

Hence there is need of a device which will accurately indicate the rate of motion without imposing a load on the moving element whose rate of motion is to be indicated.

The present invention offers a device which involves no significant force reaction upon, and imposes no friction upon, the moving element, and yet can be adjusted to give approximately a direct proportional reading from near a state of rest throughout the range of the instrument. Furthermore, in special cases the relationship of the response of the indicator to rate of change of motion of the moving part may be modified so that in addition to the "straight line," or proportional relationship, a rising or falling or other variously curved characteristic may be had to compensate, or substantially compensate, for some varying characteristic of a particular device, such as the meters above mentioned.

Generally stated, a vacuum tube oscillator is caused to oscillate and cease oscillating in successive alternate periods whose frequency is proportional to the speed to be indicated. In this way changes of voltage are caused to occur at frequencies which vary with speed. These changes are caused each to produce an electric charge whose frequency of recurrence is sensed and indicated by an electric meter. If these charges are uniform, the meter has a straight line characteristic, i. e. its indication is in direct proportion to speed. The charges can, however, be made to vary gradually as speed varies, in which case the characteristic of the meter is modified. This fact may be applied usefully in certain cases, as will be explained.

As a convenient way of causing the oscillator alternately to oscillate and cease oscillating use is made of a notched or perforated disc or strip which travels at a rate proportional to the speed to be indicated, and serves alternately to interpose conducting (shielding) and non-conducting (non-shielding) areas between two inductively related coils associated with the oscillator. By so relating the two alternating interposed areas that for any uniform speed the significant reversals of state occur at approximately uniform intervals, and are frequent enough to give a good averaging effect at the lowest speed to be indicated, a very satisfactory direct and continuous indication of speed may be had.

Practical embodiments of the invention will now be described by reference to the accompanying drawings:

Fig. 1 is a diagram illustrating the basic principle of the invention.

Fig. 2 is a face view of a rotary disc shown in Fig. 1 and used to relate a rotating shaft to the oscillator and indicator operated thereby.

Fig. 3 is a face view of another type of disc which could be used where higher rotary speeds than those contemplated for the disc of Fig. 2 are encountered.

Fig. 4 is a fragmentary view of a perforated metal tape or strip which may be used when the rate of rectilinear motion is to be indicated.

Fig. 5 is a fragmentary view of a notched metal tape also used where rectilinear motion is to be indicated.

Fig. 6 is a diagram representing the changes of potential with respect to time as the oscillator changes back and forth between the oscillating and non-oscillating states.

Fig. 7 is a diagram of the pulses produced by the voltage changes diagrammed in Fig. 6.

Fig. 8 is a diagram indicating how the basic principle of Fig. 1 may be elaborated to give greater sensitivity and precision and to permit the device to be set to deliver charges at two rates (one twice the other) for any given speed, thus affording two speed ranges for a single instrument.

Fig. 9 is a diagram of the alternate pulses produced in one of the two sub-circuits in the device of Fig. 8.

Fig. 10 is a similar diagram of the alternate pulses produced in the other sub-circuit.

Figs. 11 and 12 are diagrams showing the selective amplification of impulses from the two series of Figs. 9 and 10 respectively.

Fig. 13 is a diagram showing the combination in a single series of the pulses forming the two series shown in Figs. 11 and 12.

Fig. 14 illustrates various characteristic curves which may be attained by proper adjustment of the speed indicator.

The arrangement shown in Fig. 1 illustrates a simple form of the invention designed for measuring the speed of a rotary element. In this arrangement a shaft 11 is driven by any rotary element, the speed of which is to be measured. For example, assume that shaft 11 is the shaft of an anemometer whose cups appear at 12. Mounted upon the shaft 11 is a disc 13 formed of good conductive material, such as copper or brass. The disc has a number of uniformly spaced holes 14 formed near the periphery thereof.

In one successful device ten holes ⅝" in diameter were used in a disc whose diameter was 3½", but these dimensions are illustrative and subject to wide variation. The compactness of the device is, however, indicated by the figures given. The holes 14 may be formed entirely within the edge of the disc 2, but I prefer to slot the outer edge of the holes, as shown at 15 in Fig. 2.

The slots inhibit the flow of eddy currents in the metal around the hole. These currents would have a shielding effect. Their inhibition by the slots 15 makes it practicable to use a hole 14 smaller than is otherwise effective. I may use a peripherally notched disc 13a in which the shoulders 15a are preferably radial, as shown in Fig. 3. This figure shows only two notches, a fact indicating that the disc is intended for use at rather high rotary speeds.

Where right line motion is to be indicated, a metal tape or strip 13b, with spaced holes 14b, may replace the disc 13 and is, of course, moved longitudinally between the inductively related coils at the speed of the element to be measured. The strip 13c of Fig. 5 has notches 14c with edges 15c at right angles to the path of motion, and can also be used where right line motion is to be indicated.

The rotating disc 13 (or its analogs 13a, 13b or 13c) is arranged to control the state of oscillation of a vacuum tube oscillator comprising a suitable vacuum tube represented by the triode 16 having a parallel tuned circuit formed of a coil 17, and a condenser 18 connected in the grid circuit thereof. The plate circuit of the oscillator includes a feed-back coil 19 in inductive relation to the coil 17 for setting up oscillations of a frequency determined by the constants of the tuned circuit. Inductance 21 is preferably included in the plate circuit. Plate current for tube 16 is supplied from a suitable source represented by the battery 22. The plate circuit also includes a coupling resistance 23, high frequency choke coil 24, and a high frequency bypass condenser 25 arranged to exclude the high frequency current from source 22 and the coupling resistance 23. The oscillator circuit also includes the usual grid biasing condenser 26 shunted by resistance 27. A coupling resistance 28 is connected across coupling resistance 23 by a coupling condenser 29. An indicating instrument 31 is connected across coupling resistance 28 through a suitable rectifier represented by the diode tube 32. The instrument 31 may assume the form of a direct current voltmeter, but any form of pulse averaging or totalizing device may be employed.

The inductance 21 improves the operative characteristics. The circuit is more stable, the change of state is sharper and the impulses are larger. The reason for this has not been determined with certainty and the device is operative without the inductance 21.

The rotating disc 13, or its equivalent (see Figs. 3-5), is interposed between coils 17 and 19 and is arranged so that oscillations are produced only during the time when one of the holes 14 (or its equivalent in Figs. 3-5) is situated between the coils 17 and 19. At other times the solid portions of disc 13 (or its equivalent) effectively shield coil 17 from coil 19 and stop oscillation. The circuit comprising coil 17 and the condenser 18 is tuned to a suitable frequency which is relatively high as compared with the frequency at which the holes 14 pass between the coils 17 and 19. For example, the circuit may be tuned to a frequency of 1500 kilocycles per second. As the disc 13 rotates, the oscillator circuit will be caused alternately to oscillate and stop oscillating. Under these conditions the direct current component in the plate circuit will vary between one value for a condition of oscillation and a higher value for a condition of no oscillation.

Figure 6 is a diagram illustrating the manner in which the direct current component in the plate circuit of Fig. 1 varies according to the state of oscillation or non-oscillation. During the oscillatory state, a negative charge is established on condenser 26 and this reduces the direct current component to a low value as indicated at A. During the non-oscillatory state there is no charge on condenser 26 and the direct current component has an increased value as indicated at B. The change from an oscillatory state to a non-oscillatory state is abrupt and, since the oscillating frequency is relatively very high with respect to the control frequency, the change is substantially unaffected by the control frequency. Figure 6 also represents the manner in which the voltage across coupling resistance 23 varies with changes in the state of the oscillator.

The changes in voltage across coupling resistance 23 are transmitted to coupling resistance 28 through condenser 29. By proper selection of the values of the resistances 23 and 28 and capacity 29, a condition may be established such that the potential developed across coupling resistance 28 by changes in current flowing through resistance 23 will be substantially as represented in Figure 7, that is to say, a sharp current pulse is transmitted at each instant where the voltage across resistance 23 changes from one value to another. As shown in Figure 7, a pulse of one polarity represented at C+ is transmitted through condenser 29 when the oscillator changes from an oscillating state to a non-oscillating state, and pulse of opposite polarity, represented at C−, is transmitted through condenser 29 when the oscillator changes from a non-oscillating state to an oscillating state. These pulses can be made uniform and then represent the transfer of equal successive charges at intervals of time inversely proportional to the angular velocity of shaft 11. The rectifier 32 permits pulses of only one polarity to pass through the indicating meter 31. Since the number of charges supplied to the meter 31 during a unit of time, i. e. the frequency of the pulses, varies with the speed of rotation of the shaft 11, the averaged effect indicated by the meter 31 must be a function of the rate of rotation of the shaft 11. Hence meter 31 can be calibrated to indicate the speed of shaft 11.

The indicator which I have devised produces negligible reaction on the driving shaft 11, as will be obvious when it is considered that at the time when a solid portion of the disc 13 or 13a (or of one of the strips 13b or 13c) is interposed between the coils 17 and 19, the circuit is non-oscillatory. No appreciable reaction is produced under this condition. During the time when one of the holes 14 (or a notch) is situated between the coils 17 and 19 there can be no reaction on the disc or strip since there is no shielding material interposed between the coils at this time.

No direct or physical contact is made between the rotating disc or strip and the coils 17 or 19. Thus there will be no friction between these elements. The number of holes in the disc or other controller element may be varied to effect any desired ratio between speed of movement and the frequency of pulsation produced in the oscillator. The number of holes or notches should be sufficiently high to cause the meter 31 to give a steady indication at the lowest speed to be indicated.

The oscillator, together with the movable control element, such as disc 13, may be located at a distance from the remaining part of the device for the generated pulses may be transmitted to the indicating equipment at any desired point over a wired circuit, or through any other suitable medium of transmission.

Various substitutes for discs 13, 13a and tapes 13b and 13c will readily suggest themselves.

Various other modifications may be made. For example, the diode tube 32 may be replaced by a triode tube which will rectify and amplify the impulses developed across resistance 28 and supply the amplified impulses to meter 31. A number of indicating meters or pulse-averaging devices obviously may be connected in series if desired.

Since the rectifier 32, as used in Fig. 1, permits only pulses of one polarity to pass to the meter, it is sufficient if the holes 14 be uniformly spaced around the disc 13 and be of a size suited to the dimension and spacing of the coils 17 and 19. The relation of the size of holes 14 to their spacing is not material so long as the interval between holes is great enough to give effective shielding.

However, in Fig. 8, there is illustrated a circuit in which effective impulses are passed to the meter at the rate of two per hole 14 (or two per notch, if notches are used), one being delivered as shielding ends and another as shielding begins.

Such an arrangement is desirable because, if means be provided to suppress at will one of the two alternating types of impulse, it is possible to provide an instrument having two speed ranges, one of which is twice the other.

However, this introduces a new factor. The spacing of impulses should be substantially uniform and for this condition the arc subtended by a hole is not necessarily equal to the arc subtended by the interval between two holes. The relationship is affected by the size and spacing of coils 17 and 19 and other factors not susceptible of precise statement, but is readily determinable by test with any particular set of coils.

Precise uniformity of interval between impulses at a given speed is not vital because the meter is an averaging device, but the condition should be approximated. The important point from the standpoint of disclosure is that the relation of hole to interval is not necessarily one of equality.

In Fig. 8 there is shown the preferred embodiment of the invention. The oscillator circuit is identical with that in Fig. 1 and identical parts bear the same reference numerals. The disc 13 is designed according to principles just discussed.

Substituted for the coupling resistance 23 in the output circuit is the primary 33 of a transformer whose secondary is indicated at 34. A second transformer has its primary 35 in circuit with the secondary 34. The secondary 36 of this second transformer has a center tap connected to ground, as indicated at 37, and affords a split between two amplifying sub-circuits in which respectively are generated two series of alternately reverse pulses which are 180° out of phase as between the two sub-circuits.

The opposite extremities of secondary winding 36 are respectively connected to the grids of the amplifier tubes 38 and 39, through frequency selective networks (comprising shunt resistance 41, condensers 42 and 43, resistances 44 and 45) and through resistances 46 and 47.

A switch 49 is provided to permit one sub-circuit to be interrupted and hence suppressed. Double throw switches 51, 52 are used to interrupt the connection shown and to connect for test purposes a source 53 of signal impulses of known frequency.

Plate current for amplifier tubes 38 and 39 is supplied by a suitable source, such as battery 54, through coupling resistances 55 and 56. The amplifier tubes 38 and 39 amplify pulses substantially of one polarity only, the pulses of opposite polarity being virtually suppressed by the action of the limiting resistors 46 and 47.

The output circuits of amplifier tubes 38 and 39 are connected in parallel through condensers 57 and 58 and resistor 59. The potential pulses produced across resistor 59 are applied between the grid and the cathode of a gaseous relay tube 61. The grid of tube 61 is connected with a suitable source 62 of biasing potential connected in series with resistance 59 and with a grid-current limiting resistance 63.

The plate circuit of relay tube 61 includes a suitable source of current represented by battery 64, a coil 65, and a current-limiting resistance 66.

The cathode circuit of relay tube 61 includes a suitable coupling resistance 67. This is shunted by a condenser 68 whose function is to restore the relay tube 61 to a non-conducting condition after each excitation. Each actuation of relay tube 61 by a positive impulse causes a definite pulse or electric charge to flow in this cathode circuit of tube 61, including resistance 67. The relay tube 61 is then immediately restored to non-conducting condition, all as will be apparent to those skilled in the art.

Thus a predetermined and uniform pulse is produced for each activation of tube 61.

These pulses are transmitted through coil 69 and through a suitable rectifier represented by diode 71 to a coupling network consisting of resistors 72 and 73 and condensers 74 and 75 connected as shown.

Resistor 73 and a variable portion of resistor 72 are included in the grid circuit of amplifier tube 76 through a limiting resistor 77. Plate current for tube 76 is supplied from a suitable source such as battery 78.

Biasing resistors 79 and 81 (the latter variable) are provided and are connected as shown. The indicating meter 82 (the analog of meter 31 of Fig. 1) is connected in the cathode circuit of amplifier tube 76. A condenser 83 shunts the meter 82 and a portion of the resistor 81.

The resistor 77 prevents the grid of tube 76 from becoming substantially positive with respect to its cathode and thus prevents reaction on the coupling network 72, 73, 74, 75. Also, rectifier 71 prevents reaction of the coupling network 72, 73, 74, 75 upon the coupling network 67, 68 during the decay period when the time factor for the coupling network 67, 68 is smaller than the time factor for the coupling network 72, 73, 74 and 75.

*Operation*

It will be apparent that the oscillator will produce current changes in primary 33 as indicated in Fig. 6 and the impulses induced in secondary 34 will be as indicated in Fig. 7. It is desirable that the impulses C+ and C— occur at uniform intervals as already explained.

The current pulses of Fig. 7 upon flowing through primary 35 will induce pulses in secondary 36, and these induced pulses will be transmitted through network 41—42—43—44—45 to the grid circuits of amplifiers 38 and 39, the upper half of secondary 36 supplying impulses to amplifier 38, while the lower half supplies impulses to amplifier 39. The effective impulses supplied to the grid of amplifier 38 are represented in Fig. 9, while Fig. 10 represents the impulses supplied to amplifier 39. In Figs. 9 and 10, D and E represent positive and negative impulses applied to amplifiers 38 and 39 respectively, for each positive impulse in Fig. 7, while D' and E' represent negative and positive impulses applied to amplifiers 38 and 39 respectively, for each negative impulse of Fig. 7. The center tap connection 37 to secondary 36 causes impulses of opposite polarity to be applied to amplifiers 38 and 39 for each pulse in Fig. 7.

Amplifier 38 amplifies only the impulses D' of Fig. 9 producing pulses as in Fig. 11, and 39 amplifies only the impulses E of Fig. 10 producing pulses as in Fig. 12. The reversal of polarity of pulse indicated in Figs. 11 and 12 is characteristic of such an amplifier.

Thus the amplified impulses across resistance 59 are made up of two alternating series as shown in Fig. 13.

The D' series of Fig. 13 may be suppressed by opening switch 49.

Each activation of tube 61 produces a uniform pulse similar to those shown in Fig. 13 and timed therewith. It follows that the tube 76 is activated by pulses produced at a rate directly dependent on the rate of rotation of shaft 11, so that meter 82 will give an averaging reading which will be a continuous indication of the rate of rotation of the shaft.

The coupling network 72, 73, 74 and 75, and also the meter 82, condenser 83 and the included portion of resistor 81, will have a filtering action on the current pulses, dependent upon the frequency of such pulses. This affects the characteristic of response of meter 82 to changes of speed of shaft 11 and within limits may be availed of to vary the characteristics as a speed indicator.

If the charges delivered to the meter for each pulse be uniform throughout the range of the instrument, then the indicator will have a proportional or straight line characteristic. If the charges vary gradually, that is, if the charge delivered and the frequency both vary in response to change of speed, the response of the meter will not be strictly proportional to speed. In such case the instrument will have a curving characteristic.

For example, if resistance 73 be zero and the included portion of resistance 81 have a finite value, the instrument will have a characteristic curve of the general form of curve F in Fig. 14. Proper choice of value for the components of the frequency selective networks will give characteristic curves such as G, H, K and L (Fig. 14). To facilitate selection of a characteristic curve having a desired shape, resistance 73 and other component parts of the frequency selective networks may be variable.

This is a very useful feature. Consider an anemometer in which rotary speed rises at a rate which increases faster than wind speed. Adjustment of the indicator to have a characteristic such as the curve F of Fig. 14 can be caused to produce quite accurate compensation. In fact wind tunnel tests with an anemometer and indicator so compensated according to the invention give a substantially straight line relationship between actual wind velocity and indicated velocity.

While two embodiments of the invention have been described in considerable detail, these are illustrative and not limiting. Modifications within the scope of the claims may be made by the exercise of mechanical skill and are contemplated.

What I claim is:

1. In a speed indicator, the combination of a vacuum tube oscillator having a feedback; means moving with a part whose speed is to be measured for periodically interrupting and then restoring the oscillation of said oscillator by alternate stopping and starting of said feedback, the frequency of such interruption being proportional to the speed of movement of such means; means controlled by said oscillator for producing a series of substantially uniform electrical charges recurring at a frequency corresponding to the frequency of the interruption of oscillation; and an indicating instrument responsive to said charges for indicating the frequency thereof, the frequency of oscillation of the vacuum tube oscillator being so high relatively to the frequency of interruption of oscillation that variations of the latter frequency have no significant effect on the uniformity of the charges.

2. In a speed indicator, the combination of a vacuum tube oscillator having a feedback; means moving with a part whose speed is to be measured for periodically interrupting oscillation of said oscillator by controlling said feedback at a frequency proportional to the speed being measured; means for deriving from the plate circuit of said oscillator a series of substantially uniform electrical charges having a frequency corresponding to the frequency of interruption of oscillations; and electric means controlled by said charges, including an indicating instrument, for producing an indication proportional to the frequency of said charges at any instant.

3. In a speed indicator, the combination of a vacuum tube oscillator having a feedback connection, a movable element driven at a speed proportional to the speed to be measured, means controlled by said movable element for periodically interrupting oscillation of said oscillator by controlling said feedback connection at a frequency proportional to the speed of movement of said element, whereby the plate current of said oscillator abruptly changes from one value to another value at each instant of change in oscillating state, means for deriving from said plate circuit successive electrical charges, one at each instant of change in the plate current, and means controlled by said charges for indicating the frequency thereof.

4. Apparatus for measuring the speed of a moving body, comprising a vacuum tube oscillator having a feedback connection, a control element driven by said moving body and operating to stop periodically oscillation of said oscillator by interrupting said feedback at a frequency proportional to the speed of said body, electric circuit means for deriving from the plate circuit of said oscillator a series of electrical charges having a frequency corresponding to the frequency of interruption of oscillation, and means controlled by said charges for indicating the frequency of said pulses at any instant.

5. Apparatus for measuring the speed of a moving body, comprising a vacuum tube oscillator having a grid circuit and a plate circuit inductively coupled to the grid circuit, a moving control element driven by said moving body and comprising a metallic element having a series of shielding and non-shielding areas arranged to pass between the inductive coupling elements in said grid and plate circuits periodically to start and stop oscillation of said oscillator at a frequency proportional to the speed of said body, whereby the plate current of said oscillator abruptly changes from one value to another value at each instant of change in oscillating state, means for deriving an electrical charge from said plate circuit at each instant of change in the plate current, and means controlled by said charges for indicating the frequency thereof at any instant.

6. In a speed indicator, the combination of a vacuum tube oscillator having a feedback connection, means for periodically interrupting oscillation of said oscillator by periodically stopping energy transfer through said feedback connection at a frequency proportional to the speed to be measured, whereby the plate current of said oscillator abruptly changes from one value to another value at each instant of change in oscillating state, a resistance element included in the plate circuit of said oscillator, a condenser and a resistance element connected in serial circuit relation around said first-mentioned resistance element, whereby current pulses of one polarity will flow through the second resistance element when the plate current changes in one direction, and the current pulse of opposite polarity will flow through said second resistance element when the plate current changes in the opposite direction, and means responsive to the potential differences across said second resistance element for indicating the frequency of said current pulses.

7. In a speed indicator, the combination of a vacuum-tube oscillator, means for periodically interrupting oscillation of said oscillator, such interruption recurring at a frequency proportional to the speed to be measured, whereby the plate current of said oscillator abruptly changes from one value to another value at each instant of change in oscillating state, an output circuit coupled to the plate circuit of said oscillator including a transformer having a tapped secondary winding, a translating circuit controlled by one portion of said secondary winding for producing a current pulse of one polarity for each interruption of oscillation of said oscillator, a second translating circuit controlled by the opposite portion of said secondary winding for producing a pulse of the same polarity for each starting of oscillation of said oscillator, and an indicating instrument controlled jointly by the pulses produced in said translating circuits.

8. A speed indicator according to claim 7 and including a switch for interrupting at will one of said translating circuits to change the relation between the indication of said indicating instrument and the speed being measured.

9. A speed indicator according to claim 7 wherein a frequency-selective circuit is interposed between the oscillator and the indicating instrument for modifying the relation between the indication produced by said instrument and the frequency of interruption of said oscillator.

10. In a speed indicator, the combination of a vacuum tube oscillator; means for periodically interrupting oscillation of said oscillator, such interruption being at a frequency proportional to the speed being measured; means for deriving from the plate circuit of said oscillator two series of current pulses, one corresponding to arrest and the other to restoration of oscillation, and hence out of phase with each other but having frequencies corresponding with the frequency of interruption; and electric means controlled by said pulses and including an indicating instrument adapted to produce an indication proportional to the frequency of said pulses.

11. In a speed indicator, the combination of a vacuum tube oscillator; means for periodically interrupting oscillation of said oscillator, such interruption being at a frequency proportional to the speed being measured; means for deriving from the plate circuit of said oscillator two series of current pulses, one corresponding to arrest and the other to restoration of oscillation, and hence out of phase with each other but having frequencies corresponding with the frequency of interruption; electric means controlled by said pulses and including an indicating instrument adapted to produce an indication proportional to the frequency of said pulses; and means operable to suppress one of said two series of pulses, at least so far as effect on the indicating instrument is concerned.

12. A speed indicator according to claim 7 wherein an adjustable frequency-selective circuit is interposed between the oscillator and the indicating instrument for modifying the relation between the indication produced by said instrument and the frequency of interruption of said oscillator to impart different characteristics to said instrument.

DONALD A. WILBUR.